US008660728B2

(12) United States Patent
Saida

(10) Patent No.: US 8,660,728 B2
(45) Date of Patent: Feb. 25, 2014

(54) BICYCLE MOTOR-ASSIST CONTROL SYSTEM

(75) Inventor: Takao Saida, Osaka (JP)

(73) Assignee: Shimano Inc., Osaka (JP)

( * ) Notice: Subject to any disclaimer, the term of this patent is extended or adjusted under 35 U.S.C. 154(b) by 96 days.

(21) Appl. No.: 13/271,313

(22) Filed: Oct. 12, 2011

(65) Prior Publication Data

US 2012/0109436 A1 May 3, 2012

(30) Foreign Application Priority Data

Oct. 29, 2010 (JP) ................................. 2010-244337

(51) Int. Cl.
*G06F 19/00* (2011.01)
*B62M 23/02* (2010.01)

(52) U.S. Cl.
CPC ............... *G06F 19/00* (2013.01); *B62M 23/02* (2013.01)
USPC .................................. 701/22; 701/1; 280/210

(58) Field of Classification Search
USPC ........... 701/22, 1; 340/432; 180/206.3, 206.4, 180/206.6; 318/430; 474/70, 78, 80; 116/62; 482/57; 472/21, 89; 280/210, 280/238; 230/238
See application file for complete search history.

(56) References Cited

U.S. PATENT DOCUMENTS

| | | | | |
|---|---|---|---|---|
| 4,490,127 A * | 12/1984 | Matsumoto et al. | ........... | 474/110 |
| 4,859,984 A * | 8/1989 | Romano | ........................ | 340/432 |
| 5,621,382 A * | 4/1997 | Yamamoto | ..................... | 340/432 |
| 5,625,336 A * | 4/1997 | Yamamoto | ..................... | 340/432 |
| 6,015,159 A * | 1/2000 | Matsuo | .......................... | 280/238 |
| 6,490,507 B1 * | 12/2002 | Campagnolo | ..................... | 701/1 |
| 6,957,129 B2 * | 10/2005 | Hatanaka et al. | ................. | 701/1 |
| 7,247,108 B2 * | 7/2007 | Takeda | ............................. | 474/70 |
| 7,258,216 B2 * | 8/2007 | Yoshiie et al. | .................. | 192/46 |
| 2008/0071436 A1 * | 3/2008 | Dube et al. | ...................... | 701/22 |
| 2009/0204299 A1 * | 8/2009 | Miglioranza | ................... | 701/51 |
| 2011/0254673 A1 * | 10/2011 | Jean et al. | ...................... | 340/432 |
| 2012/0305325 A1 * | 12/2012 | Ito | .............................. | 180/206.6 |
| 2013/0045827 A1 * | 2/2013 | Kobayashi et al. | ........... | 475/149 |

FOREIGN PATENT DOCUMENTS

| | | |
|---|---|---|
| EP | 0 700 826 A1 | 9/1995 |
| GB | 2 336 575 A | 10/1999 |
| JP | 9-286376 A | 11/1997 |
| JP | 9-290795 A | 11/1997 |
| JP | 2000-118481 A | 4/2000 |

(Continued)

OTHER PUBLICATIONS

European Search Report of corresponding EP Application No. 11 18 6074.8 dated Jan. 6, 2012.

*Primary Examiner* — Thomas Tarcza
*Assistant Examiner* — Tyler J Lee
(74) *Attorney, Agent, or Firm* — Global IP Counselors

(57) ABSTRACT

A bicycle motor control system is configured to control a drive assistance motor that can be installed on a bicycle having a drive force transmitting body. The bicycle motor control system comprises a memory device, a pedaling force detecting device, a propulsion force calculating section and a motor control section. The memory device stores a tooth count of a plurality of transmitting teeth of the drive force transmitting body. The pedaling force detecting device detects a pedaling force. The propulsion force calculating section calculates a propulsion force based on a pedaling force detected by the pedaling force detecting device and the tooth count of the transmitting teeth stored in the memory device. The motor control section controls the motor based on the propulsion force.

13 Claims, 9 Drawing Sheets

(56) References Cited

FOREIGN PATENT DOCUMENTS

| | | |
|---|---|---|
| JP | 2001-10581 A | 1/2001 |
| JP | 3190491 B2 | 5/2001 |
| JP | 2002-137786 A | 5/2002 |
| JP | 2003-104278 A | 4/2003 |
| JP | 2004-38722 A | 2/2004 |
| JP | 2004-350355 A | 12/2004 |
| JP | 3810130 B2 | 6/2006 |
| JP | 2008-296652 A | 12/2008 |
| JP | 2010-13027 A | 1/2010 |

* cited by examiner

BICYCLE MOTOR-ASSIST CONTROL SYSTEM

CROSS-REFERENCE TO RELATED APPLICATIONS

This application claims priority to Japanese Patent Application No. 2010-244337, filed on Oct. 29, 2010. The entire disclosure of Japanese Patent Application No. 2010-244337 is hereby incorporated herein by reference.

BACKGROUND

1. Field of the Invention

This invention generally relates a motor control system. More specifically, the present invention relates to a bicycle motor control system that controls a drive assistance motor that can be installed on a bicycle having a drive force transmitting body on which a plurality of transmitting teeth are formed.

2. Background Information

In an assisted bicycle configured to use a motor to assist with pedaling of the bicycle, it is a known technology to have a motor control system that is provided with a transmission device and configured to control a motor assistance rate in accordance with a current shift position of the bicycle (e.g., see Japanese Laid-Open Patent Publication No. 11-245876). With a conventional motor control system, the assistance rate is changed based on a detection result of a shift position sensor serving to detect the current shift position such that, regardless of which gear is selected, a ratio (assist ratio) of a drive wheel output torque generated by the motor with respect to the drive wheel output torque generated by a rider can be held constant.

SUMMARY

While the assistance ratio is determined according to the current shift position in the conventional arrangement explained above, the gear ratios will change if the front sprocket and/or the rear sprocket is changed to a sprocket having a different number of teeth. Thus, with the conventional arrangement, a propulsion force resulting when a rider pedals will be different even if the rider pedals with the same pedaling force and, consequently, the assist ratio will be different. As a result, it will not be possible to keep the assist ratio constant among the different shift positions by changing the assistance rate according to the current shift position. The front sprocket and the rear sprocket are examples of a drive three transmitting body.

An object of the present invention is to provide a bicycle motor control system that can drive a motor at a prescribed assist ratio even if a tooth count of a drive force transmitting body of the bicycle is changed.

Another object of the present invention is to provide a bicycle motor control system having a transmission device that can keep the assist ratio constant at all shift positions even if a tooth count of a drive force transmitting body of the bicycle is changed.

According to a first aspect, a bicycle motor control system is configured to control a drive assistance motor that can be installed on a bicycle having a drive force transmitting body. The bicycle motor control system comprises a memory device, a pedaling force detecting device, a propulsion force calculating section, and a motor control section. The memory device stores a tooth count (a number) of a plurality of transmitting teeth of the drive force transmitting body. The pedaling force detecting device detects a pedaling force resulting when, for example, a rider depresses a pedal. The propulsion force calculating section calculates the propulsion force based on the pedaling force detected by the pedaling force detecting device and the tooth count of transmitting teeth stored in the memory device. The motor control section controls the motor based on the propulsion force.

With this motor control system, the tooth count of transmitting teeth formed on the drive force transmitting body is stored in the memory device. A propulsion force is calculated based on the stored tooth count and the pedaling force, and the motor is controlled based on the propulsion force. For example, the motor control part controls the motor at the same rate with respect to the propulsion force. Since the number of transmission teeth is stored in the memory device, even if the drive force transmitting body is changed to a drive force transmitting body having a different number of transmitting teeth, the propulsion force can be calculated accurately based on the number of transmitting teeth by overwriting the number of transmitting teeth stored in the memory device with the number of transmitting teeth of the newly installed drive force transmitting body. Thus, even if the number of transmitting teeth of the drive force transmitting body is changed, the desired assistance force can be generated to contribute to the propulsion force, i.e., the motor can be driven at the desired assist ratio.

According to a second aspect, the bicycle motor control system according to the first aspect further comprises a shift position detecting device that detects a current shift position among a plurality of shift positions of an external transmission device installed on the bicycle. The memory device is further configured to store the current shift position of the external transmission device and the tooth count of the drive force transmitting body that corresponds to a sprocket of the drive force transmitting body that is engaged based on the current shift position detected by the shift position detecting device. The propulsion force calculating part is further configured to calculate the propulsion force based on the pedaling force detected by the pedaling force detecting device and the tooth count of the sprocket stored in the memory device corresponding to the current shift position detected by the shift position detecting device.

Since the tooth count of the sprocket corresponding to each shift position is stored in the memory device, even if a sprocket of the external transmission device is changed to a sprocket having a different number of transmitting teeth, the propulsion force can be calculated accurately based on the number of sprocket teeth by overwriting a tooth count stored in the memory device with a tooth count of the newly installed sprocket. As a result, even if a tooth count of a sprocket is changed, the rate of the assistance three with respect to the propulsion force can be made equal for all shift positions and the motor can be driven at a constant assist ratio.

According to a third aspect, the bicycle motor control system according to the second aspect is configured such that the memory device is configured to store the shift positions of the external transmission device that includes a front derailleur and a plurality of front sprockets and the tooth count of each of the front sprockets corresponding to each of the shift positions of the front derailleur with respect to the front sprockets. With this aspect, even if the tooth count of a front sprocket is changed, the assistance force can be generated at the same rate with respect to the propulsion force for all of the shift positions.

According to a fourth aspect, the bicycle motor control system according to the second aspect is configured such that the memory device is configured to store the shift positions of the external transmission device that includes a rear derailleur and a plurality of rear sprockets and the tooth count of each of the rear sprockets corresponding to each of the shift positions of the rear derailleur with respect to the rear sprockets. With this aspect, even if the tooth count of a rear sprocket is changed, the assistance force can be generated at the same rate with respect to the propulsion force for all of the shift positions.

According to a fifth aspect, the bicycle motor control system according to the second aspect is configured such that the memory device is configured to store the shift positions of the external transmission device that includes a front derailleur, a plurality of front sprockets, a rear derailleur and a plurality of rear sprockets, and the tooth count of each of the front and rear sprockets corresponding to each of the shift positions of the front and rear derailleurs with respect to the front and rear sprockets, respectively. With this aspect, even if the tooth count of a rear sprocket is changed, the assistance force can be generated at the same rate with respect to the propulsion force for all of the shift positions.

According to a sixth aspect, the bicycle motor control system according to any one of the second to fifth aspects is configured such that the shift position detecting device is configured and arranged to be provided on the external transmission device. With this aspect, a gear number of a current shift position can be detected easily because the gear number is detected at a place where a gear change operation occurs.

According to a seventh aspect, the bicycle motor control system according to any one of the second to sixth aspects is configured such that the memory device is further configured to store the tooth count of both a front sprocket and a rear sprocket. The propulsion force calculating part is configured to calculate the propulsion force by multiplying the pedaling force by a value obtained by dividing the tooth count of the rear sprocket by the tooth count of the front sprocket. As a result, the propulsion force can be calculated highly accurately based on the tooth counts of the front sprockets and rear sprockets actually installed on the bicycle.

According to an eighth aspect, the bicycle motor control system according to the first aspect further comprises a shift position detecting device that detects a current shift position of a plurality of shift positions of an internal transmission device installed on the bicycle. The memory device is further configured to store the shift positions of the internal transmission device and a gear ratio corresponding to each of the shift positions. The propulsion force calculating part is configured to calculate the propulsion force based on the pedaling force, the gear ratio stored in the memory device that corresponds to the current shift position detected by the shift position detecting device and the tooth count of the transmitting teeth of the drive force transmitting body stored in the memory device.

With this aspect, the gear ratios of the internal transmission device are stored in correspondence to the shift positions, and the number of transmitting teeth of the drive force transmitting body is also stored in the memory device. As a result, even if the drive force transmitting body (e.g., a front sprocket and/or a rear sprocket) is changed to a drive force transmitting body having a different number of transmitting teeth, the propulsion force can be calculated accurately based on the tooth count of the drive force transmitting body by overwriting a tooth count stored in the memory device with a tooth count of the newly installed drive force transmitting body. As a result, even if the drive force transmitting body is changed to one having a different tooth count, the rate of the assistance force with respect to the propulsion force can be made equal for all shift positions and the motor can be driven at a constant assist ratio.

According to a ninth aspect, the bicycle motor control system according to the first to eighth aspects is provided such that the memory device is further configured to store the tooth count of the drive force transmitting body that includes one a sprocket, a toothed pulley and a bevel gear. The present invention is applicable even if the drive force transmitting body is a sprocket, a toothed pulley, or a bevel gear.

According to a tenth aspect, the bicycle motor control system according to any one of the first to ninth aspects, wherein the system device comprises an interface section operatively coupled to the memory device to overwrite information stored in the memory device. Thus, the information stored in the memory device can be overwritten through the interface section. As a result, information stored in the memory device, including the number of transmitting teeth of the drive force transmitting body, can be overwritten using a personal computer or other external device connected to the memory device through the interface section.

According to an eleventh, the bicycle motor control system according to the tenth aspect further comprises an input device that is connected to the interface section. With this aspect, information in the memory device, including numbers of teeth, can be overwritten using the input device.

According to a twelfth aspect, the bicycle motor control system according to the eleventh aspect is configured such that the interface section is configured to communicate using electric power line communication. With this aspect, the number of communication lines can be reduced because information stored in the memory device can be overwritten using electric power line communication.

With the bicycle motor control system disclosed herein, the number of transmission teeth is stored in the memory device. Thus, even if the drive force transmitting body is changed to a drive force transmitting body having a different number of transmitting teeth, the propulsion force can be calculated based on the number of transmitting teeth by overwriting the number of transmitting teeth stored in the memory device with the number of transmitting teeth of the newly installed drive force transmitting body. As a result, even if the number of transmitting teeth of the drive force transmitting body is changed, the desired assistance force can be generated to contribute to the propulsion force, i.e., the motor can be driven at the desired assist ratio.

In another aspect of the present invention, the tooth count of the sprocket corresponding to each shift position is stored in the memory device. Consequently, even if a sprocket of the external transmission device is changed to a sprocket having a different number of transmitting teeth, the propulsion force can be calculated based on the number of sprocket teeth by overwriting a tooth count stored in the memory device with a tooth count of the newly installed sprocket. As a result, even if a number of sprocket teeth is changed, the rate of the assistance force with respect to the propulsion force can be made equal for all shift positions and the motor can be driven at a constant assist ratio.

In another aspect of the present invention, the gear ratios of an internal transmission device are stored in correspondence to the shift positions, and the number of transmitting teeth of the drive force transmitting body is also stored in the memory device. Consequently, even if the drive force transmitting body (e.g., a front sprocket and/or a rear sprocket) is changed to a drive force transmitting body having a different number of transmitting teeth, the propulsion force can be calculated accurately based on the tooth count of the drive force transmitting body by overwriting a tooth count stored in the memory device with a tooth count of the newly installed drive force transmitting body. As a result, even if the drive force transmitting body is changed to one having a different tooth count, the rate of the assistance force with respect to the propulsion force can be made equal for all shift positions and the motor can be driven at a constant assist ratio.

Various objects, features, aspects and advantages of the bicycle motor control system presented in this disclosure will become apparent to those skilled in the art from the following detailed description, which, taken in conjunction with the annexed drawings, discloses two illustrative embodiments of the bicycle motor control system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
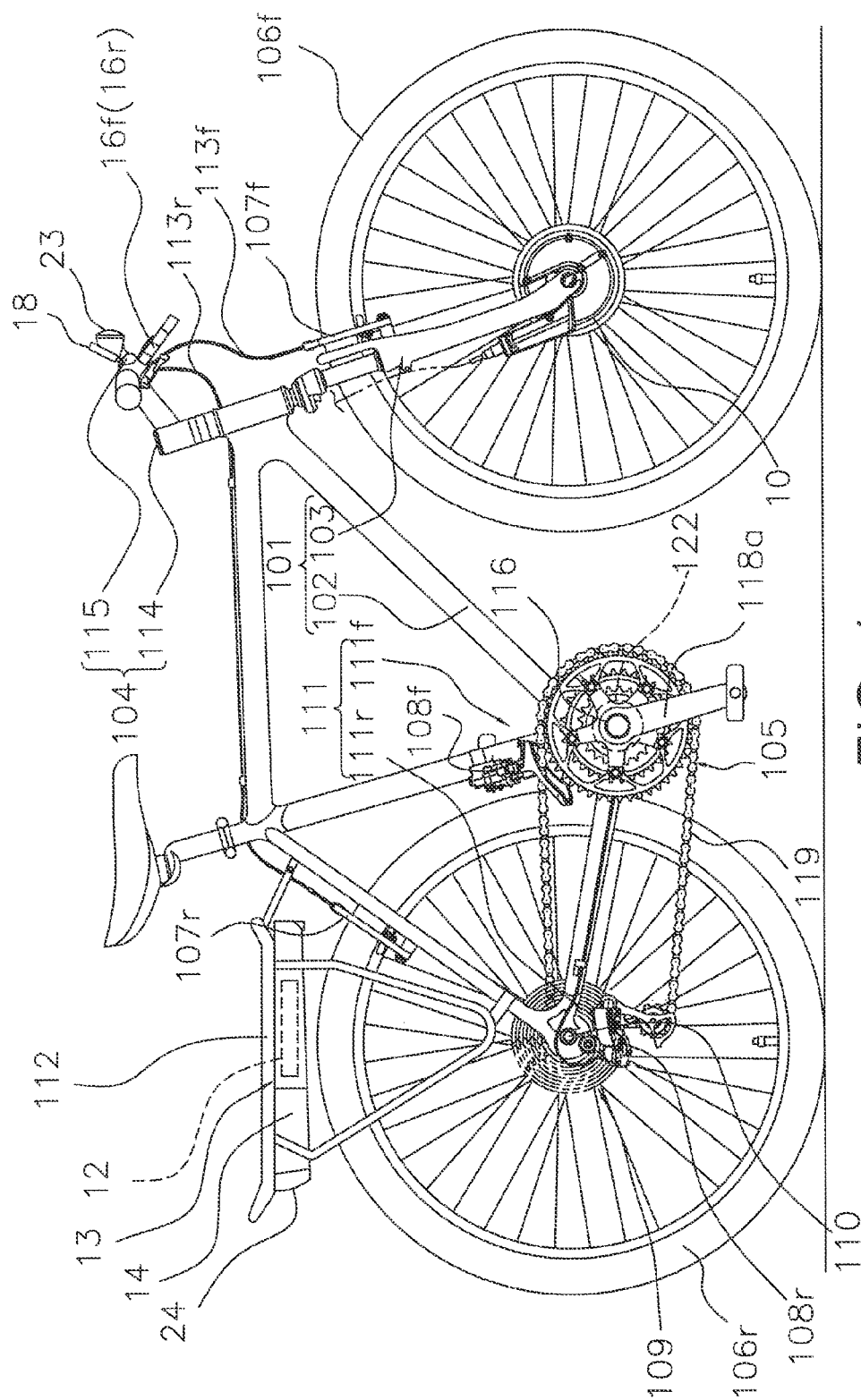
FIG. 1 is a side elevational view of a bicycle equipped with a bicycle motor control system in accordance with a first embodiment.

FIG. 1 shows an assisted bicycle according to a first embodiment of the present invention. This bicycle is configured to use a motor unit 10 to assist a drive force imparted by a rider. The motor unit 10 is controlled by a general control device 12. In the explanations that follow, the left and right directions of the bicycle are normally defined to be left and right directions observed when the bicycle is viewed from the rear.

The bicycle comprises a frame 101 having a frame body 102 and a front fork 103, a handlebar unit 104, a drive device 105, a front wheel 106f, a rear wheel 106r, a front brake device 107f, a rear brake device 107r, a headlamp 23, and a tail lamp 24. The front fork 103 is attached to a frontward portion of the frame body 102 such that it can pivot about a slanted axis. The front brake device 107f serves to brake the front wheel 106f, and the rear brake device 107r serves to brake the rear wheel 106r. The handlebar unit 104 and other components are attached to frame 101. The drive device 105 comprises a crank axle 116 rotatably supported in a hanger part of the frame body 102, a right gear crank arm 118a and a left crank arm (not shown) fixed to opposite ends of the crank axle 116, a chain 119 arranged on the right gear crank arm 118a, and an external transmission device 111. The external transmission device 111 includes a front external transmission device 111f and a rear external transmission device 111r.

Figure 2:
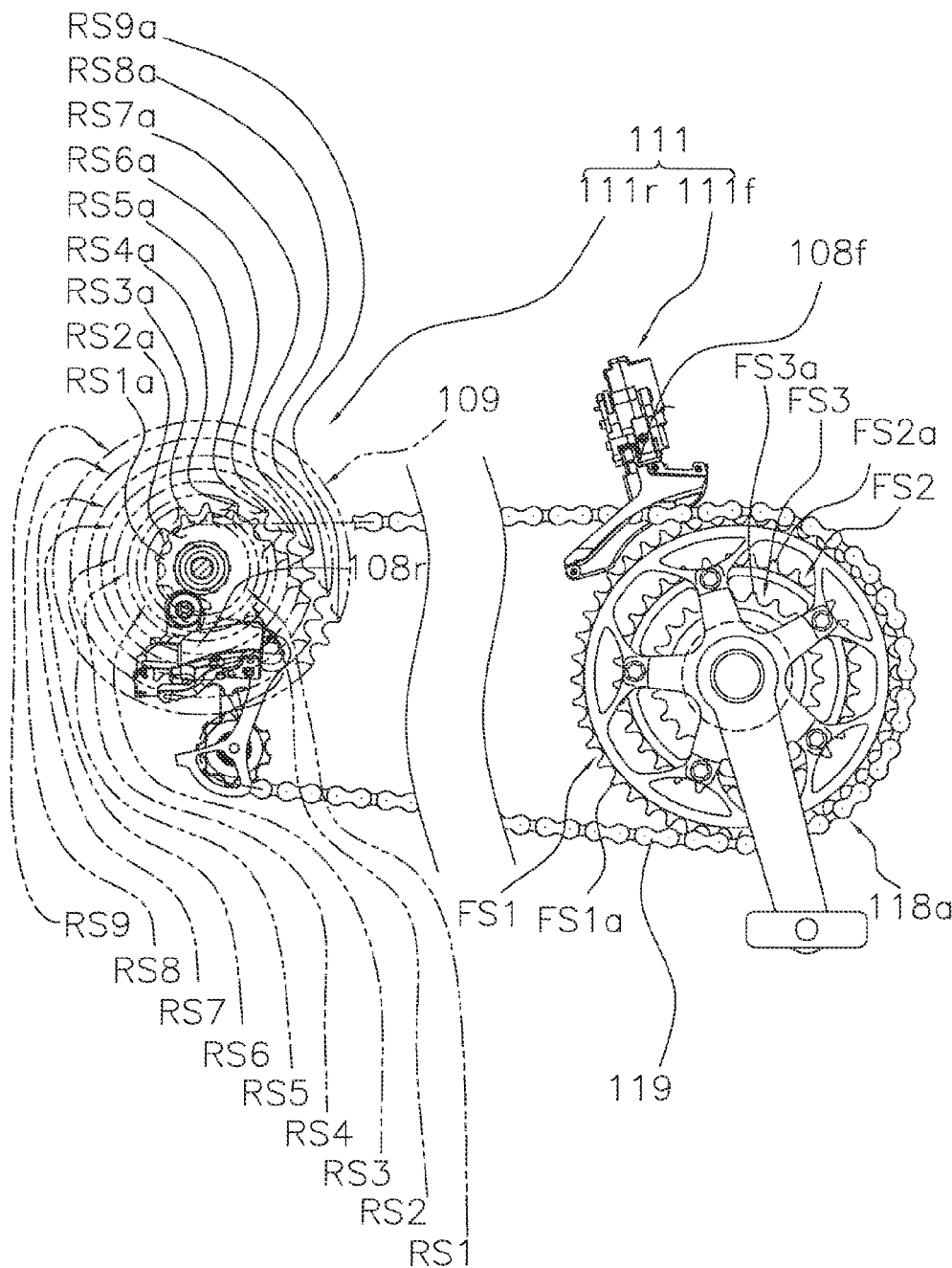
FIG. 2 is a side elevational view of an external transmission device used with the bicycle motor control system according to the first embodiment.

As shown in FIG. 2, the front external transmission device 111f has a front derailleur 108f and a plurality of (three in this embodiment) front sprockets FS1 to FS3 that are attached to the gear crank 118a and have different numbers of sprocket teeth FS1a to FS3a. The sprocket teeth FS1a to FS3a are examples of transmitting teeth. As shown in FIG. 1, the front derailleur 108f can be attached to a middle portion of the frame body 102, e.g., to a seat tube. The front derailleur 108f serves to place the chain 19 onto one of the three front sprockets FS1 to FS3. The tooth count FT of the sprocket teeth FS1a of the front sprocket FS1 is, for example, 44. The tooth count FT of the sprocket teeth FS2a of the front sprocket FS2 is, for example, 32. The tooth count FT of the sprocket teeth FS3a of the front sprocket FS3 is, for example, 22.

As shown in FIG. 2, the rear external transmission device 111r has a rear derailleur 108r and a plurality of (nine in this embodiment) rear sprockets RS1 and RS9 making up a cassette sprocket 109 mounted on a rear hub 110 of the rear wheel 106r. The rear derailleur 108r can be installed on a rearward portion of the frame body 102. The rear derailleur 108f serves to place the chain 19 onto one of the nine rear sprockets RS1 to RS9. The tooth counts RT of the rear sprockets increase as one progresses from the rear sprocket RS1 to the rear sprocket RS9. The tooth counts RT of the sprocket teeth RS1a to RS9a of the rear sprockets RS1 to RS9 are, for example, 11, 13, 15, 17, 20, 23, 26, 30, and 34, respectively. The sprocket teeth RS1a to RS9a are examples of transmitting teeth. In this embodiment, the front derailleur 108f and the rear derailleur 108r are both electrically powered. The rear derailleur 108r can be installed on a rearward portion of the frame body 102 as shown in FIG. 1.

A rear carrier 112 is attached to an upper rearward portion of the frame body 102 as shown in FIG. 1. A rear carrier unit 13 that includes the general control device 12 is attached to the rear carrier 112. The rear carrier unit 13 is configured such that the motor unit 10 (explained later), the general control unit 12, and a power storage device 14 serving as an electric power source to the headlamp 23 and other components can be mounted on the rear carrier unit 13. The power storage device 14 includes a storage battery, such as, for example, a nickel hydrogen battery or a lithium ion battery. The tail lamp 24 is attached to the power storage device 14 so as to form an integral unit.

Figure 5:
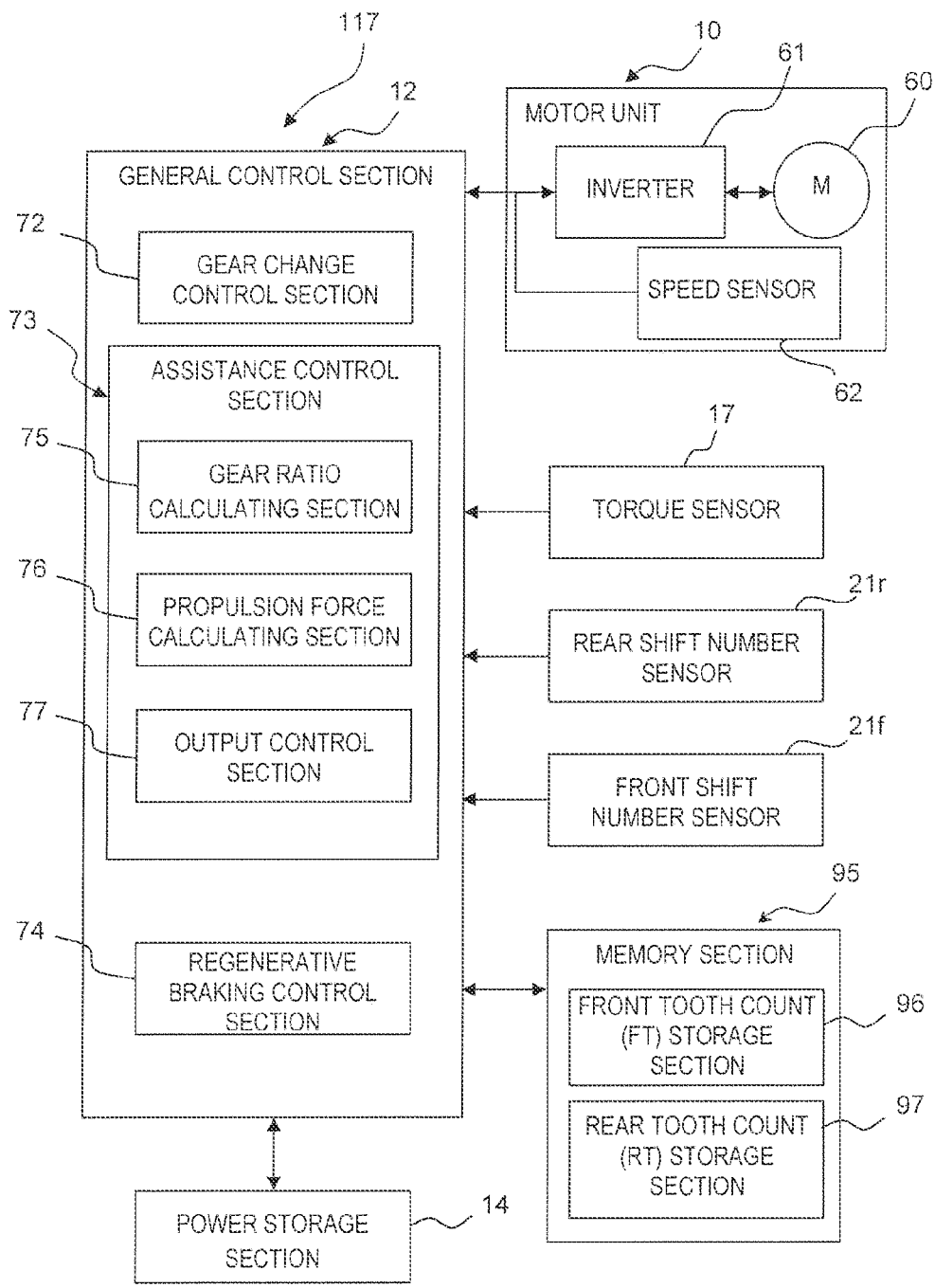
FIG. 5 is a block diagram showing the functional features of a general control device of for the bicycle motor control system of the first embodiment.

The motor unit 10 serves to apply an assistance drive force to the front wheel 106f. The motor unit 10 is attached to a center of the front wheel 106f. As shown in FIG. 5, a motor 60, an inverter 61, and a speed sensor 62 are provided inside the motor unit 10. The motor 60 is, for example, a three-phase brushless DC motor or an AC motor. The inverter 61 is configured to convert a DC current outputted from the power storage device 14 into an AC current suitable for the motor 60 to produce an assistance force in accordance with an assist mode. The inverter 61 is also configured to vary a regenerative braking force of the motor 60. The speed sensor 62 detects a rotational speed of the motor 60, i.e., a speed of the bicycle.

A torque sensor 17 (see FIG. 5) is provided in a hanger part 122 for detecting a pedaling force acting on the crank axle 116. An angle sensor (not shown) is provided in a hanger part 122 for detecting a rotational angle of the crank axle 116.

The general control device 12 is inside the rear carrier unit 13. The general control device 12 has a microcomputer and serves to control electrical components that are connected to the control device 12. The general control device 12 controls the motor unit 10 such that, during an assist mode, an assistance force generated is no larger than N1 times a propulsion force generated by a rider through the drive device 105. The general control device 12 controls the motor 60 with a plurality of regenerative braking modes and a plurality of assist modes. More specifically, the general control unit 12 has three assist modes: a high assist mode in which a propulsion force is supplemented with an assisting force of N1 times the propulsion force, a medium assist mode in which a propulsion force is supplemented with an assisting force of N2 times the propulsion force, and a low assist mode in which a propulsion force is supplemented with an assisting force of N3 times the propulsion force. The values N1, N2, and N3 are numbers expressing predetermined assistance rates AR selected such that N1>N2>N3. For example, the numbers might be selected such that N1 has a value of 2, N2 has a value of 1.5, and N3 has a value of 1.

A regenerative braking mode includes two braking modes: a normal regeneration mode and a brake regeneration mode in which a braking force is varied according to a movement position of a lever member 31 of a right brake lever 16f and/or a left brake lever 16r explained later.

The operating modes of the motor unit 10 also include an off mode in which neither assisting nor regenerative braking is conducted.

As shown in FIG. 1, the handlebar unit 104 has a handlebar stem 114 fixed to an upper portion of the front fork 103 and a standard flat or riser type handlebar 115 that is fixed to the handlebar stem 114. A right brake lever 16f and a left brake lever 16r as well as grips 15 are attached to both ends of the handlebar 115. A display device 18 is fixed to a middle portion of the handlebar 115. The right handle lever 16f and the left handle lever 16r are provided with operating switches including gearshift switches for executing shift operations of the front derailleur 108f and the rear derailleur 108r. Each of the shift operation switches for front shifting and rear shifting includes an upshift switch and a downshift switch.

The front derailleur 108f has a front gear changing motor (not shown) and a front shift number sensor 21f (shown in FIG. 5). The rear derailleur 108r has a rear gear changing motor (not shown) and a rear shift number sensor 21r (shown in FIG. 5). The front shift number sensor 21f and the rear shift position 21r are examples of a shift position detecting devices. The front shift number sensor 21f detects a shift position of the front derailleur 108r, and the rear shift number sensor 21r detects a shift position of the rear derailleur 108r. The front derailleur 108f has a front control device (not shown) configured to control the front gear changing motor, and the rear derailleur 108r has a rear control device configured to control the rear gear changing motor. The display device 18 displays a current shift position of the front derailleur 108f and a current shift position of the rear derailleur 108r separately based on output from the front shift number sensor 21f and the rear shift number sensor 21r.

The display device 18 is connected to the right brake lever 16f and the left brake lever 16r with separate electric power lines 70.

Various electrical components are connected with a serial bus structure such that they communicate through electric power lines. As a result, excluding the electrical component in which the general control device 12 is installed, the electrical system can operate regardless of whether any of the electrical components is connected or disconnected. An external device having an electric power line communication device 90 (explained later) can be connected to any of the electrical components, including the rear carrier unit 13.

Figure 3:
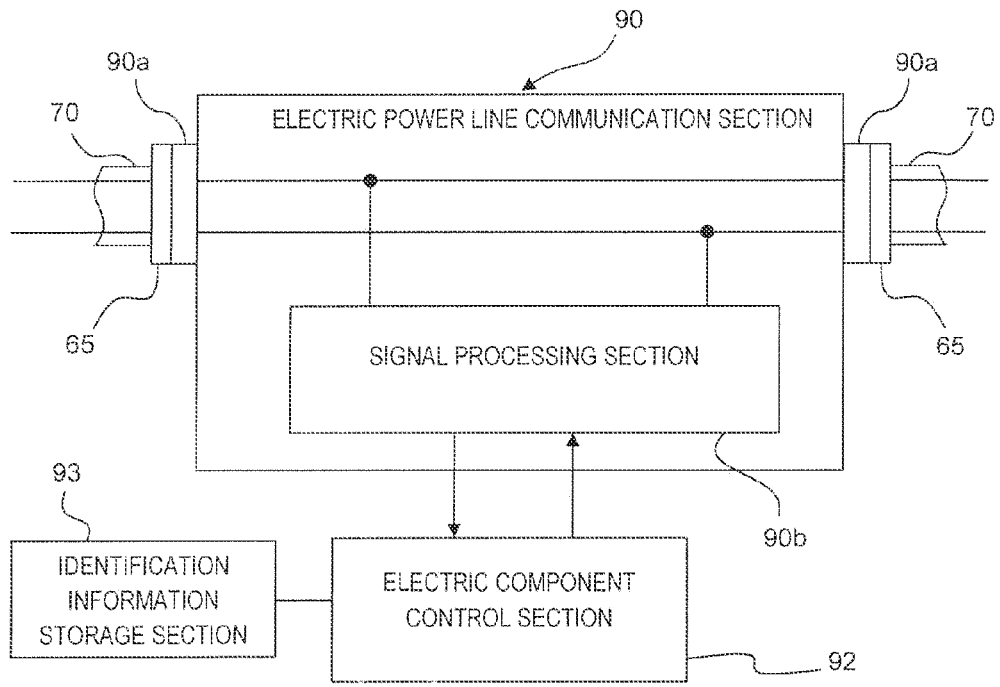
FIG. 3 is a block diagram showing the constituent components of an electric power line communication device used with the bicycle motor control system.

As shown in FIG. 3, each of the electrical components—including the electrical component in which the general control device 12 is installed—is provided with an electric power line communication device 90 and an electrical component control device 92 serving to control the electrical component. The electric power line communication device 90 is configured to communicate by means of PLC (power line communications). That is, two-way communication is executed through electric power lines. Each of the electric power line communication devices 90 has one or a plurality of electric power line connecting devices 90a. Plugs 65 are provided on both ends of the electric power line 70, and each of the electric power line connecting devices 90a is configured to latch onto a plug 65 such that it is secured in a detachable fashion.

Each of the electric power line communication devices 90 also has a signal processing device 90b configured to decode and modulate control signals superimposed on electric power. The signal processing device 90b is configured to decode and modulate control signals using, for example, an OFDM method (orthogonal frequency division multiplexing method).

The electrical component control device 92 has a microcomputer that serves to control the individual electrical component. An identification information storage device 93 storing unique identification information for the electrical component is connected to the electrical component control device 92. When an electrical component is connected, the general control device 12 receives identification information from the electrical component and recognizes the connected electrical component. As a result, the general control device 12 transmits a control signal directed to a connected electrical component and receives a control signal from the connected electrical component. The general control device 12 functions as the electrical component control device 92 of the rear carrier unit 13.

As explained previously, the electrical components are connected to a serial bus structure. The serial bus structure comprises the electric power line communication devices 90 and the electric power lines 70.

Figure 4:
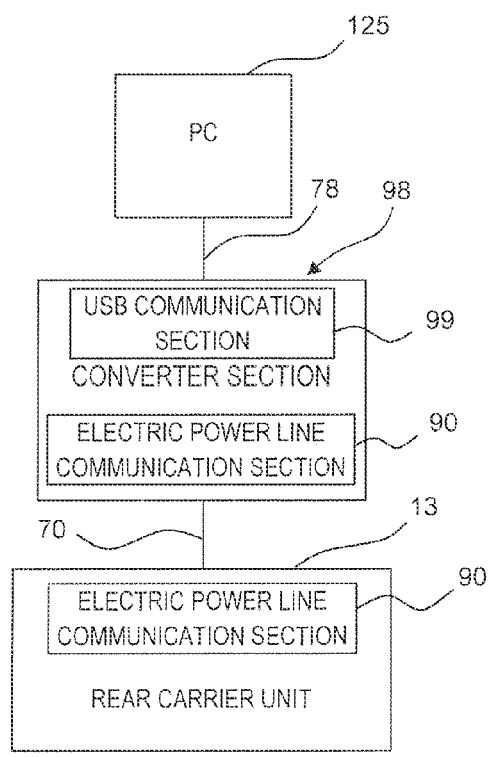
FIG. 4 is a block diagram showing configuration in which an input device is connected to the bicycle motor control system.

In this embodiment, since the electrical components are connected communicatively through electric power lines, data can be exchanged between the electrical components and an external device by providing a converter device 98 having an electric power line communication function and an external device connecting function, as shown in FIG. 4. For example, by connecting the converter device 98 to the electric power line communication device 90 of an electrical component, the content stored in a memory device 95 (explained later) can be overwritten from an external device. The electric power line communication device 90 provided in an electrical component is an example of an interface device. More specifically, in FIG. 4, the external device is an input device, e.g., a personal computer 125 (hereinafter called PC 125). The converter device 98 has the electric power line communication device 90 and, for example, a USB communication device 99 that provides an external device communication function by enabling a connection to the PC 125 compliant with a USB (universal serial bus) standard. Thus, the PC 125 can be connected to the converter device 98 with a USB cable 78.

Functional Features of Motor Control System

As shown in FIG. 5, in the first embodiment, the motor control system 117 has a general control device 12 (controller). The general control device 12 has a gear change control part 72, an assistance control part 73 and a regenerative braking control part 74, which are functional features realized with software that is executed by the general control device 12 (controller). The power storage device 14, the inverter 61, the torque sensor 17, the rear shift number sensor 21r, the front shift number sensor 21f, and the memory device 95 are connected to the general control device 12. The torque sensor 17 is an example of a pedaling force detecting device, and the memory device 95 is an example of a memory device. The memory device 95 comprises, for example, an EEPROM (electronically erasable programmable read only memory), a flash memory, or other non-volatile rewritable memory device and includes a front tooth count storage part 96 and a rear tooth count storage part 97. The memory device 95 is provided in the rear carrier unit 13 along with the general control device 12.

The front tooth count storage part 96 stores shift positions of the front external transmission device 111f and tooth counts FT of the front sprockets FS1 to FS3 corresponding to each of the shift positions. For example, the tooth counts FT of the front sprocket FS1 corresponding to a high shift position 1, the front sprocket FS2 corresponding a medium shift position 2, and the front sprocket FS3 corresponding to a low shift position 3 are stored as 44, 32, and 22, respectively, in the front tooth count storage part 96.

The rear tooth count storage part 97 stores shift positions of the rear external transmission device 111r and tooth counts RT of the rear sprockets RS1 to RS9 corresponding to each of the shift positions. The tooth counts RT of the rear sprockets RS1 to RS9 of the rear external transmission device 111r corresponding to shift positions 1 to 9 are, for example, 11, 13, 15, 17, 20, 23, 26, 30, and 34, respectively, in the rear tooth count storage part 97. By connecting a converter device 98 to an electrical component in which a memory device 95 is provided and connecting the converter device 98 to a PC 125, memory content can be overwritten using software installed into the PC as explained previously. Thus, if a front sprocket FS1 to FS3 or a rear sprocket RS1 to RS9 is changed to a sprocket having a different tooth count, then the tooth count FT or WI can be overwritten by connecting the PC 125 to the electrical component through the converter device 98.

The gear change control part 72 is configured to control a shift number of the front derailleur 108f in accordance with an operation of an upshift switch and a downshift switch of a front gearshift switch and to control a shift number of the rear derailleur 108r in accordance with an operation of an upshift switch and a downshift switch of a rear gearshift switch. The assistance control part 73 is configured to control the motor 60 through the inverter 61 in accordance with an assist mode selected by a switch operation. The regenerative braking control part 74 is configured to control the motor 60 through the inverter 61 in accordance with a regenerative braking mode selected by a switch operation.

The assistance control part 73 has a gear ratio calculating part 75, a propulsion force calculating part 76, and an output control part 77 as functional features. The propulsion force calculating part 76 is an example of a propulsion force calculating section, and the output control part 77 is an example of a motor control section. During execution of an assist mode, the gear ratio calculating part 75 reads a front tooth count FT corresponding to a current shift position of the front external transmission device 111f and a rear tooth count RT corresponding to a current shift position of the rear external transmission device 111r from the front tooth count storage part 96 and the rear tooth count storage part 97 of the memory device 95 and calculates a gear ratio R (R=FT/RT). The propulsion force calculating part 76 reads information from the torque sensor 17 expressing a torque T resulting from a current pedaling three imparted by a rider and calculates a current propulsion force DF (df=(1/R)×T) based on the calculated gear ratio R and the torque T expressed by the acquired information. The propulsion force DF expresses an output torque of a drive wheel driven by human power, i.e., an output torque of the rear wheel. The output control part 77 calculates an assistance force AF (AF=AR×DF) based on the calculated propulsion force DF and an assistance rate AR corresponding to the assist mode and controls the output of the motor 60 based on the calculated assistance force AF.

Control Operation of the Assistance Control Device

The control operations of the general control device 12 and the assistance control part 73 will now be explained based on the control flowchart shown in FIG. 6. The control operations shown in FIG. 6 are merely an example of control operations according to the present invention and the present invention is not limited to those shown in the figure.

When electric power from the storage device 14 is supplied to the general control device 12, the general control device 12 starts executing control operations.

Figure 6:
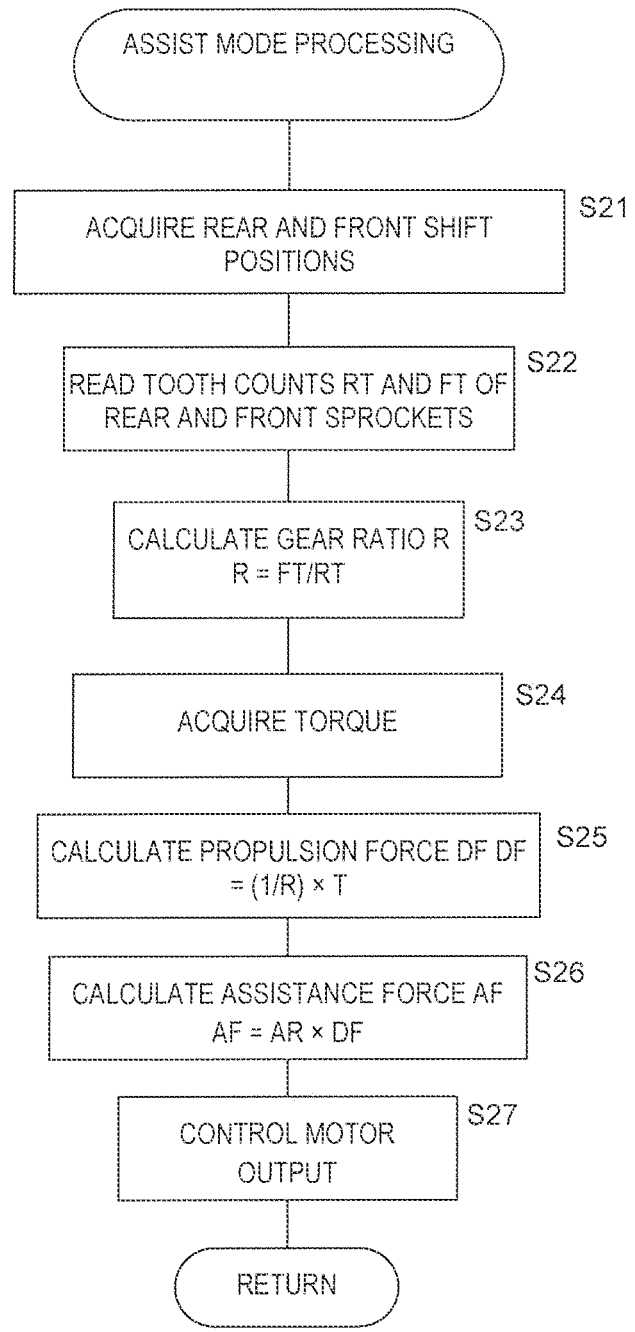
FIG. 6 is a flowchart showing assist operations executed by the general control device illustrated in FIG. 1.

As shown in FIG. 6, in step S21 of the assist mode processing, the general control device 12 acquires information related to current shift positions from the rear shift number sensor 21r and the front shift number sensor 21f. In step S22, the general control device 12 acquires a front tooth count FT and a rear tooth count RT corresponding to current shift positions from the front tooth count storage part 96 and the rear tooth count storage part 97 of the memory device 95 based on information related to the current shift positions acquired in step S22. In step S23, the general control device 12 calculates a gear ratio R between the front external transmission device 111f and the rear transmission device 111r based on the acquired front tooth count FT and the acquired rear tooth count RT. More specifically, the general control device 12 calculates the gear ratio R by dividing the front tooth count FT by the rear tooth count RT (R=FT/RT). In step S24, the general control device 12 reads a torque T expressing a pedaling force of a rider from the torque sensor 17. In step S25, the general control device 12 calculates a propulsion force DF of the bicycle based on the calculated gear ratio R and the read torque T. The propulsion force DF is obtained by multiplying the torque T by the inverse of the gear ratio R (DF=(1/R)×T). In step S26, the general control device 12 calculates an assistance force AF. The general control device 12 calculates an assistance force AF by multiplying the calculated propulsion force DF by an assistance rate AR corresponding to the assist mode (AF=AR×DF). In step S27, the general control device 12 controls the output of the motor 60 through the inverter 61 of the motor unit 10 such that the motor 60 outputs the calculated assistance force AF. More specifically, the inverter 61 drives the motor 60 using a pulse width modulation corresponding to an assistance rate. It is acceptable for the assist mode processing shown in FIG. 6 to start each time a gear change operation occurs or to be executed once per predetermined time interval.

Thus, in the first embodiment, front tooth counts FT of the front sprockets FS1 to FS3 corresponding to the shift positions of the front external transmission device 111f are stored in the front tooth count storage part 96 of the memory device 95 and rear tooth counts RT of the rear sprockets RS1 to RS9 corresponding to the shift positions of the rear external transmission device 111r and the rear tooth count storage part 97 of the memory device 95. As a result, even if any of the front sprockets FS1 to FS3 and the rear sprockets RS1 to RS9 is changed to a sprocket having a different tooth count, the ratio of the assistance force with respect to the propulsion force can be made to be equal for all shift positions and the motor can be driven at a constant assist ratio.

Although in the bicycle motor control system of the first embodiment is applied to a bicycle having an external transmission device 111, the bicycle motor control system can be applied to any bicycle having a drive force transmitting body and does not depend on the existence of a transmission device.

Figure 7:
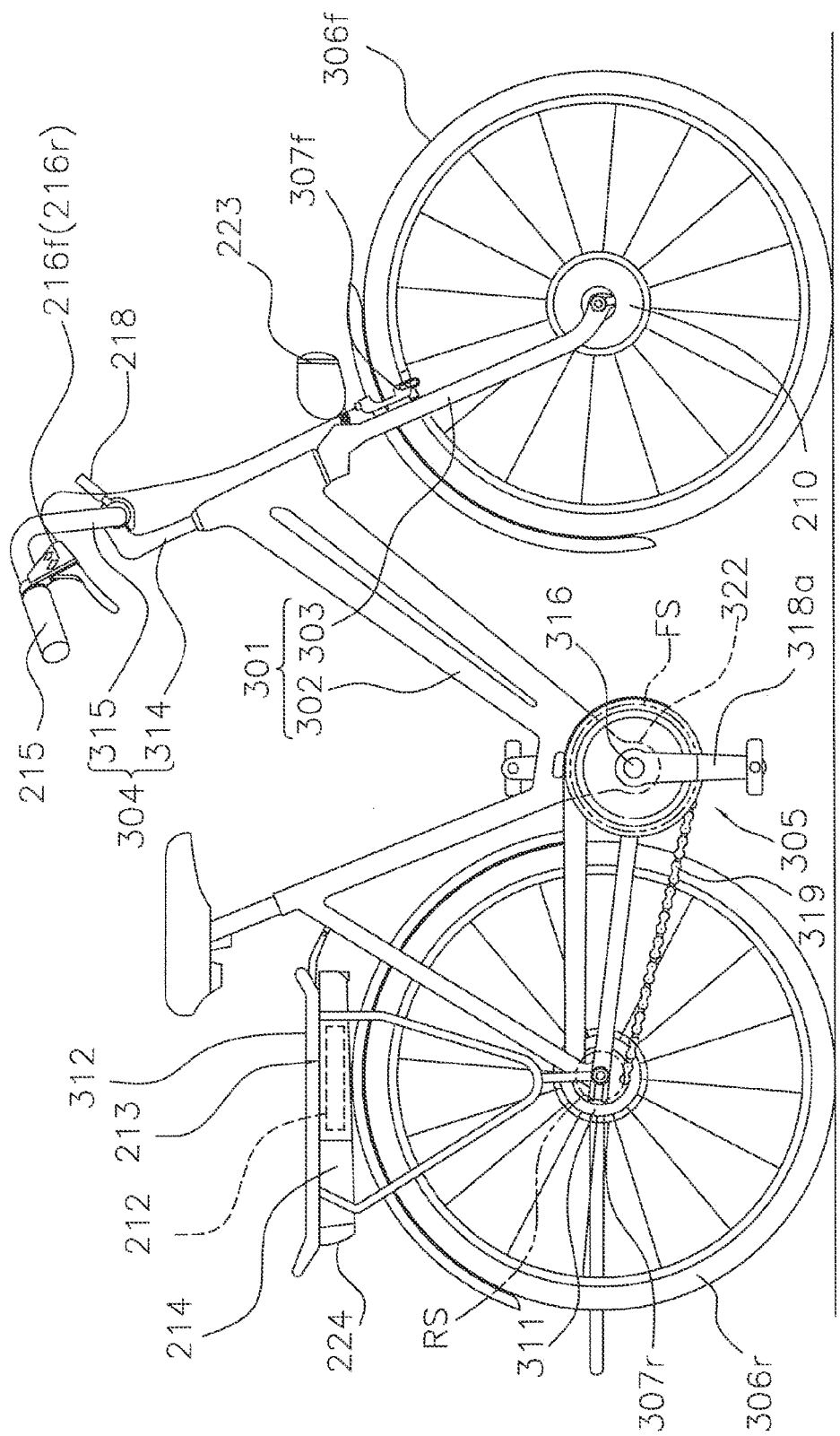
FIG. 7 is a side elevational view of a bicycle equipped with a bicycle motor control system in accordance with a second embodiment.

FIG. 7 shows an assisted bicycle according to a second embodiment. This bicycle is configured to use a motor unit 210 to assist a drive force imparted by a rider. Parts of the second embodiment that are the same or similar to the parts of the first embodiment are indicated in the drawings with reference numerals obtained by adding 200 to the reference numerals of the first embodiment. Excluding a portion of the parts, the parts are also indicated using the modified reference numerals in the explanation that follows.

Similarly to the first embodiment, the bicycle comprises a frame 301 having a frame body 302 and a front fork 303, a handlebar unit 304, a drive device 305, a front wheel 306f, a rear wheel 306r, a front brake device 307f, a rear brake device 307r, a headlamp 223, and a tail lamp 224. An internally geared hub 311 configured to be electrically driven is installed on the rear wheel 306r. The internally geared hub 311 is an example of an internal transmission device. The internally geared hub 311 has, for example, eight speeds. The gear ratios of the shift positions of the internally geared hub 311 gradually decrease as one moves from a higher gear to a lower gear. The gear ratios RI of the internally geared hub 311 are, for example, 1.61, 1.42, 1.22, 1.00, 0.85, 0.75, 0.64, and 0.53 when listed in order from the highest gear to the lowest gear. The internally geared hub 311 is equipped with a gear changing motor (not shown) and a shift number sensor 221 (shown in FIG. 8). A gear crank 318a has one front sprocket FS and the internally geared hub 311 has one rear sprocket RS. The front sprocket FS has, thr example, 32 teeth and the rear sprocket RS has, for example, 14 teeth.

A rear carrier 312 is provided on an upper rearward portion of the frame body 302 similarly to the first embodiment. A rear carrier unit 213 that includes the general control device 212 is attached to the rear carrier 312. The rear carrier unit 213 is configured such that the motor unit 210 (explained later), the general control unit 212, and a power storage device 214 serving as an electric power source to the headlamp 223 and other components can be mounted on the rear carrier unit 313. The power storage device 211 includes a storage battery, such as, for example, a nickel hydrogen battery or a lithium ion battery. The tail lamp 224 is attached to the power storage device 214 so as to form an integral unit. Instead of providing a rear carrier unit, it is also acceptable to arrange a general control device and a power storage device in a central portion of the frame body 302.

A display device 218 is basically the same as in the first embodiment except that one of the eight shift positions is displayed on a cycling computer screen. A gear shifter (not shown) has an upshift switch and a downshift switch arranged on the handlebar 315.

The constituent features of a right brake lever 216f and a left brake lever 216r are the same as in the first embodiment.

The electrical components differ from the first embodiment in that there is no electrical component for a front derailleur and there is an electrical component for the internally geared hub 311 instead of for a rear derailleur. Otherwise, the electrical components are the same as in the first embodiment. Similarly to the first embodiment, the electrical components are connected such that they communicate through electric power lines.

Functional Features of General Control Device

Figure 8:
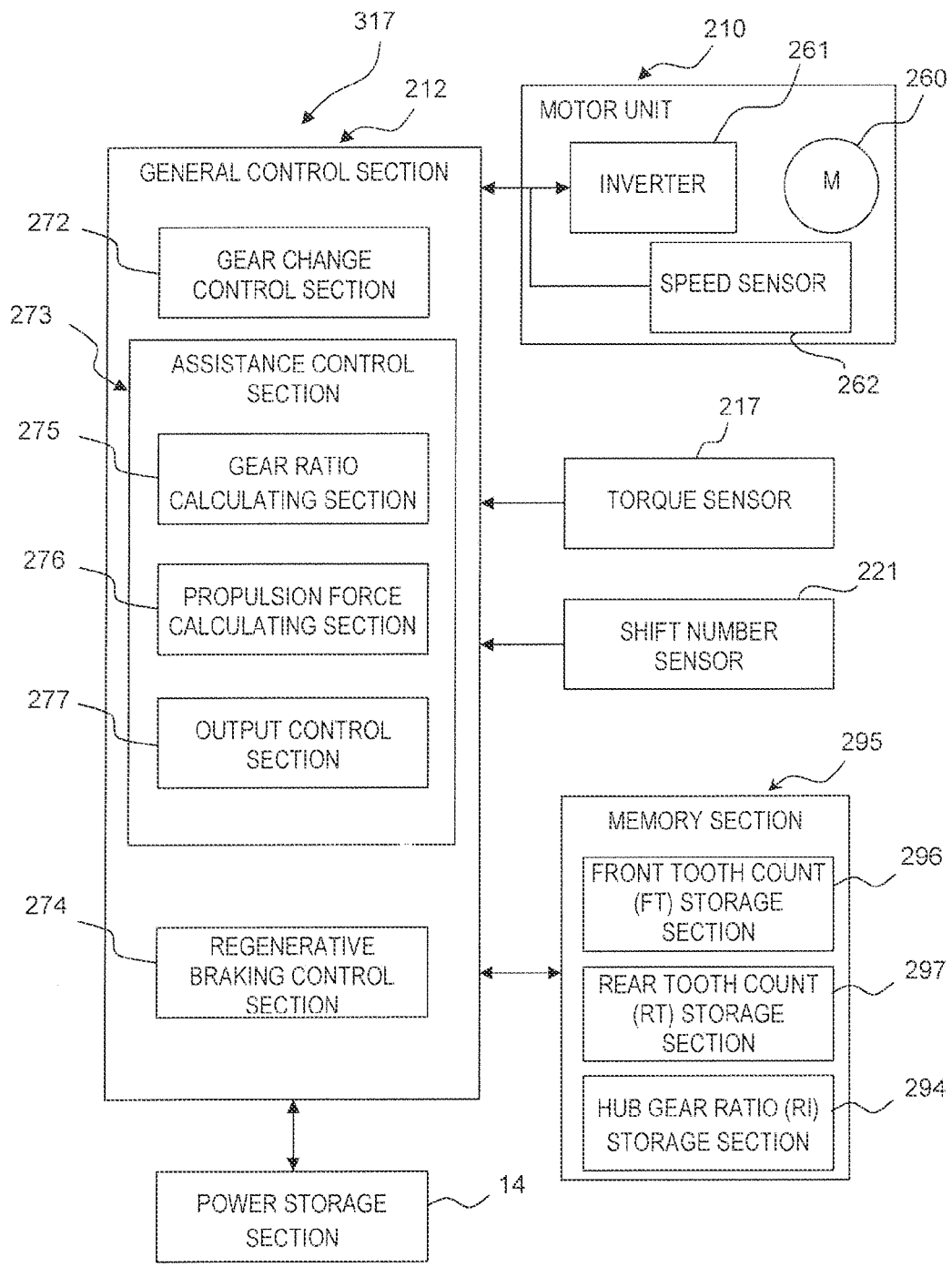
FIG. 8 is a block diagram showing the functional features of a general control device for the bicycle motor control system of the second embodiment.

As shown in FIG. 8, the motor control system 317 has a general control device 212 (controller). The general control device 212 has a gear change control part 272, an assistance control part 273, and a regenerative braking control part 274, which are functional features realized with software. The assistance control part 273 is an example of a motor assist control. The general control device 212 is connected to a storage device 214, an inverter 261, a torque sensor 217 provided in a hanger part 322, a shift number sensor 221, and a memory device 295.

The memory device 295 comprises, for example, an EEPROM (electronically erasable programmable read only memory), a flash memory, or other non-volatile rewritable memory device and includes a front tooth count storage part 296 a rear tooth count storage part 297, and a huh gear ratio storage part 294. The front tooth count storage part 296 stores a front tooth count FT of the front sprocket FS. The rear tooth count storage part 297 stores a rear tooth count RT of the rear sprocket RS. Differently from the first embodiment, in the second embodiment only one tooth count is stored for each of the front and the rear. The hub gear storage part 294 stores a gear ratio corresponding to each of the shift positions of the internally geared hub 311. The numeric values of the gear ratios are as previously explained. The memory device 295 differs from the memory device 95 of the first embodiment in that it has a hub gear ratio storage part 294. Since it is normally not necessary to overwrite the gear ratios stored in the hub gear ratio storage part 294, it is acceptable to store the hub gear ratio storage part 294 in a read-only memory part separate from the memory section 295. In such a case, it is acceptable to provide the read-only memory device inside the internally geared hub.

The gear change control part 272 controls the shift positions of the internally geared hub 311 in accordance with operations of the upshift switch and the downshift switch. The assistance control part 273 is configured to control the motor 260 through the inverter 261 in accordance with an assist mode selected by a switch operation. The regenerative braking control part 274 is configured to control the motor 260 through the inverter 261 in accordance with a regenerative braking mode selected by a switch operation.

The assistance control part 273 has a gear ratio calculating part 275, a propulsion force calculating part 276, and an output control part 277 as functional features. The gear ratio calculating part 275 reads a current front tooth count FT and a current rear tooth count RT from the front tooth count storage part 296 and the rear tooth count storage part 297 of the memory device 295, reads a current hub gear ratio RI of the internally geared hub 311 from the hub gear ratio storage part 294, and calculates a gear ratio R (R=RI×(FT/RT)). The propulsion force calculating part 276 reads information from the torque sensor 217 expressing a torque T resulting from a current pedaling force imparted by a rider and calculates a current propulsion force DF (df=(1/R)×T) based on the calculated gear ratio R and the torque T expressed by the acquired information. The output control part 277 calculates an assistance force AF (AF=AR×DF) based on the calculated propulsion force DF and an assistance rate AR corresponding to the assist mode and controls the output of the motor 260 based on the calculated assistance force AF.

Control Operation of the Assist Control Device

Figure 9:
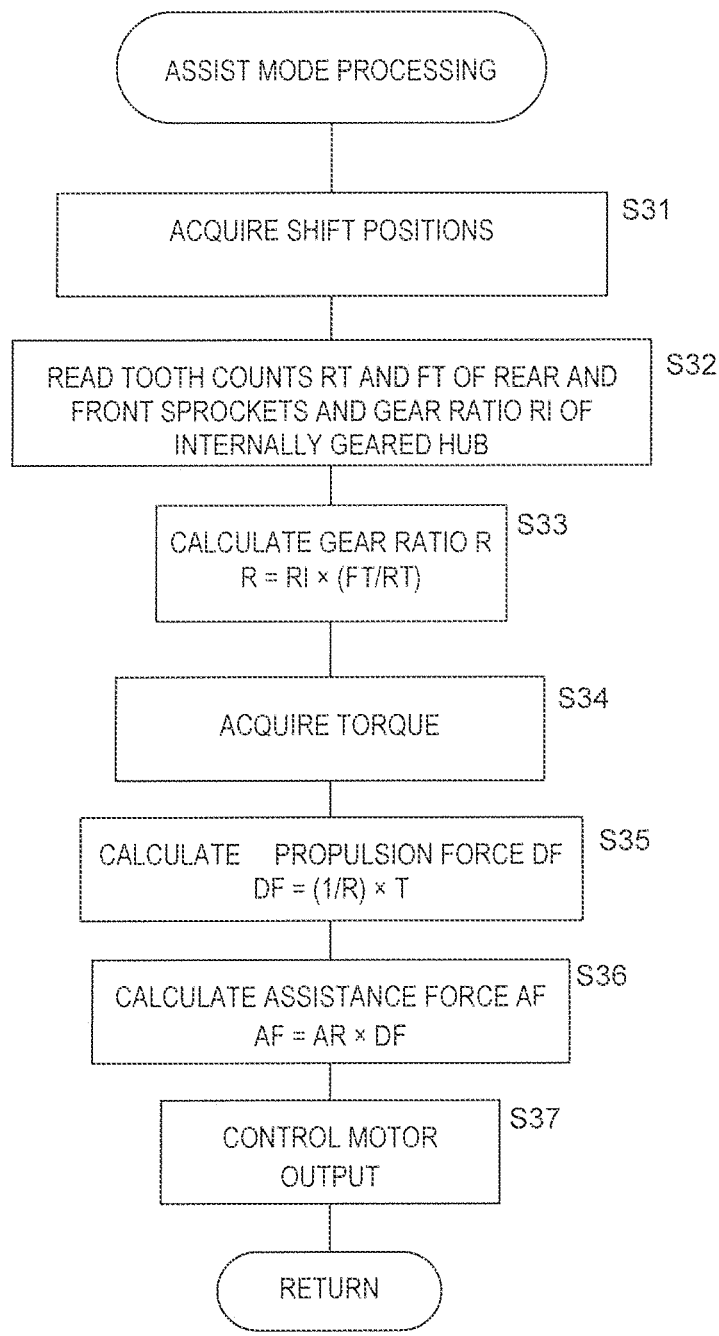
FIG. 9 is a flowchart for the bicycle motor control system of the second embodiment illustrated in FIG. 7.

The control operations of the assistance control part 273 will now be explained based on the control flowchart shown in FIG. 9. The control operations shown in FIG. 9 are merely an example of control operations according to the present invention and the present invention is not limited to those shown in the figure.

In step S31 of the assist mode processing, the assistance control part 273 reads the current front tooth count FT and rear tooth count RT from the front tooth count storage part 296 and the rear tooth count storage part 297 of the memory device 295 and reads the current hub gear ratio RI of the internally geared hub 311 from the hub gear storage part 294. In step S33, the assistance control part 273 calculates a gear ratio R between an input side of the gear crank 318a and an output side of the internally geared hub 311 based on the acquired front tooth count FT, the acquired rear tooth count RT, and the acquired hub gear ratio RI. More specifically, the assistance control part 273 calculates the gear ratio R by dividing the front tooth count FT by the rear tooth count RT and multiplying the resulting value by the hub gear ratio ($R=RI\times(FT/RT)$). In step S34, the assistance control part 273 reads a torque T expressing a pedaling force of a rider from the torque sensor 217. In step S35, the assistance control part 273 calculates a propulsion force DF of the bicycle based on the calculated gear ratio R and the read torque T. The propulsion force DF is obtained by multiplying the torque T by the inverse of the gear ratio R ($DF=(1/R)\times T$). The propulsion force DF expresses an output torque of a drive wheel driven by human power, i.e., an output torque of the rear wheel. In step S36, the assistance control part 273 calculates an assistance force AF. The assistance control part 273 calculates an assistance force AF by multiplying the calculated propulsion force DF by an assistance rate AR corresponding to the assist mode ($AF=AR\times DF$). In step S37, the assistance control part 273 controls the output of the motor 260 through the inverter 261 of the motor unit 210 such that the motor 260 outputs the calculated assistance force AF. More specifically, the inverter 261 drives the motor 260 using a pulse width modulation corresponding to an assistance rate.

In this way, the second embodiment enables the present invention to be applied to a bicycle having an internally geared hub 311 and achieve the same operational effects as the first embodiment.

Although embodiments have been presented heretofore, it will be apparent to those skilled in the art from this disclosure that the present invention is not limited to these embodiment and various modifications can be made without departing from the scope of the invention as defined by the claims. For example, functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s).

(a) Although in the previously explained, embodiments the front derailleur 108f, the rear derailleur 108r, and the internally geared hub 311 are electrically driven, it is acceptable if these gear changing devices are driven with a cable connected to a gear shifter.

(b) Although in the previously explained embodiments a front shift number sensor 21f, a rear shift number sensor 21r, and a shift number sensor 221 are provided on the gear changing devices as shift position detecting devices, it is acceptable to provide a shift position detecting device on a gear shifter. In particular, if the gear changing devices are driven manually using a cable connected to a gear shifter instead of electrically, then it is acceptable to detect a shift position based on an operating position of the gear shifter.

Figure 10:
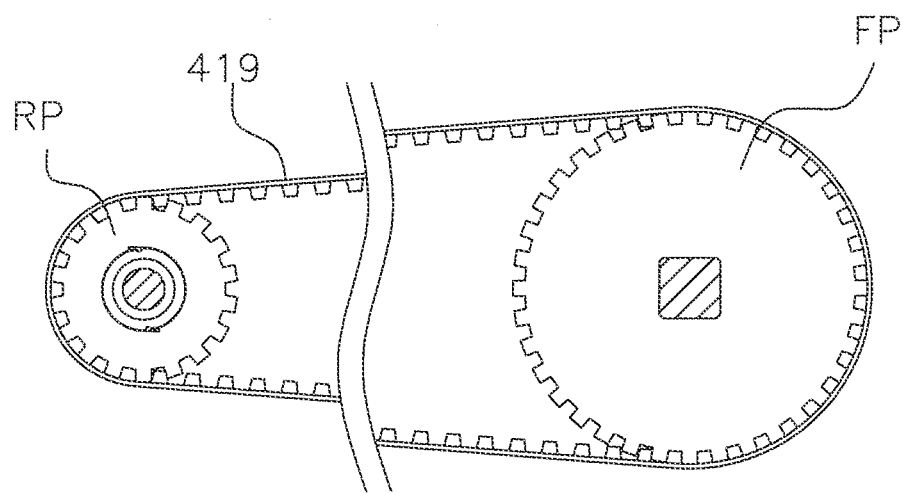
FIG. 10 is a simple sketch of a drive force transmitting body that can be used with the bicycle motor control system.
Figure 11:
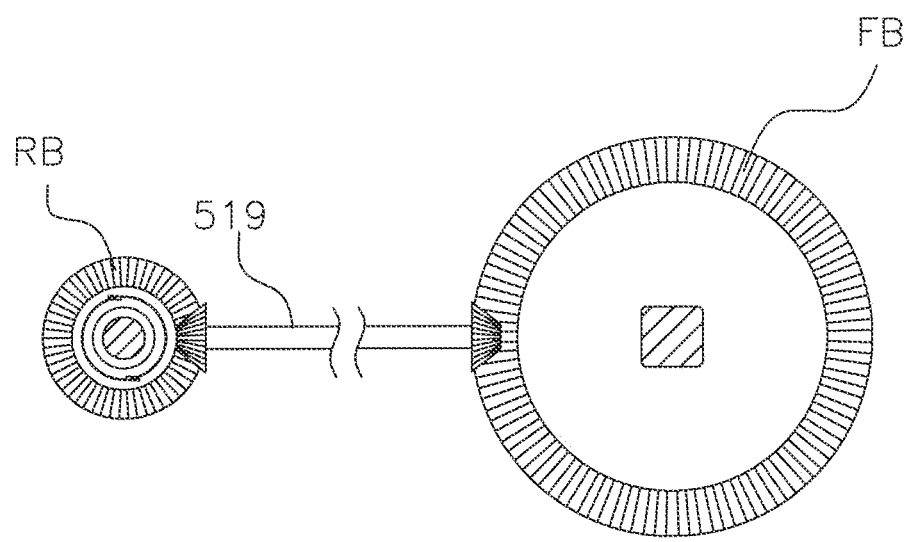
FIG. 11 is a simple sketch of a drive force transmitting body that can be used with the bicycle motor control system.

(c) Although the previously explained embodiments disclose a sprocket as a drive force transmitting body having transmitting teeth, the invention is not limited to such a drive force transmitting body. As shown in FIG. 10, the present invention can also be applied to a belt-driven bicycle having a front toothed pulley FP and a rear toothed pulley RP connected with a toothed belt 419. In such a bicycle, the toothed pulleys serving as drive force transmitting bodies having transmitting teeth. Additionally, as shown in FIG. 11, the present invention can also be applied to a shaft-driven bicycle having a front bevel gear FB and a rear bevel gear RB connected with a coupling shaft 519. In either case, the tooth counts of the toothed pulleys or the bevel gears should be stored in a memory device such that they can be overwritten.

(d) Although in the previously explained embodiments the electrical components are connected such that they can communicate through electric power lines, the present invention can be applied to a system in which normal control lines and electric power lines are provided separately.

(e) The present invention is not limited to using a PC 125 as an input device and connecting the PC 125 to an electrical component through a converter device 98, as is done in the previously explained embodiments. For example, it is acceptable to provide input keys, e.g., numeric keys for inputting numeric values, on a display device to serve as an input device and to overwrite content stored in the memory device using the display device. In such a case, the display device can be configured such that it can be switched among an assist screen, a cycling computer screen, and an input screen.

(f) Although in the previously explained embodiments the PC 125 serving as the input device is connected to the rear carrier unit 13 through the converter device 98, the input device can be connected to any one of the electrical components that has an electric power line communication device 90.

(g) Although in the previously explained embodiments only the tooth counts stored in the memory device 25 are overwritten, it is also acceptable to contrive the system such that the number of shift positions is stored in addition to the tooth counts. In such a case, when, for example, the number of rear sprockets is increased from 9 to 10 or decreased from 9 to 8, the number of shift positions stored in the memory device are increased from 9 to 10 or decreased from 9 to 8 and the tooth counts corresponding to each sprocket are also stored.

Thus, the foregoing descriptions of the embodiments according to the present invention are provided for illustration only, and not for the purpose of limiting the invention as defined by the appended claims and their equivalents.

What is claimed is:

1. A bicycle motor control system configured to control a drive assistance motor that can be installed on a bicycle having a drive force transmitting body, the bicycle motor control system comprising:
   a memory device that stores a tooth count of a plurality of transmitting teeth of the drive force transmitting body;
   a pedaling force detecting device that detects a pedaling force;
   a propulsion force calculating section that calculates a propulsion force based on a pedaling force detected by the pedaling force detecting device and the tooth count of the transmitting teeth stored in the memory device; and a motor control section that controls the motor based on the propulsion force.

2. The bicycle motor control system according to claim 1, further comprising
a shift position detecting device that detects a current shift position among a plurality of shift positions of an external transmission device installed on the bicycle;
the memory device being further configured to store the current shift position of the external transmission device and the tooth count of the drive force transmitting body that corresponds to a sprocket of the drive force transmitting body that is engaged based on the current shift position detected by the shift position detecting device; and
the propulsion force calculating section is further configured to calculate the propulsion force based on the pedaling force detected by the pedaling force detecting device and the tooth count of the sprocket stored in the memory device that is engaged based on the current shift position detected by the shift position detecting device.

3. The bicycle motor control system according to claim 2, wherein
the memory device is configured to store the shift positions of the external transmission device that includes a front derailleur and a plurality of front sprockets and the tooth count of each of the front sprockets corresponding to each of the shift positions of the front derailleur with respect to the front sprockets.

4. The bicycle motor control system according to claim 2, wherein
the memory device is configured to store the shift positions of the external transmission device that includes a rear derailleur and a plurality of rear sprockets and the tooth count of each of the rear sprockets corresponding to each of the shift positions of the rear derailleur with respect to the rear sprockets.

5. The bicycle motor control system according to claim 2, wherein
the memory device is configured to store the shift positions of the external transmission device that includes a front derailleur, a plurality of front sprockets, a rear derailleur and a plurality of rear sprockets, and the tooth count of each of the front and rear sprockets corresponding to each of the shift positions of the front and rear derailleur with respect to the front and rear sprockets, respectively.

6. The bicycle motor control system according to claim 2, wherein
the shift position detecting device is configured and arranged to be provided on the external transmission device.

7. The bicycle motor control system according to claim 2, wherein
the memory device is further configured to store the tooth count of both a front sprocket and a rear sprocket, and
the propulsion force calculating section is further configured to calculate the propulsion force by multiplying the pedaling force by an inverse of a value obtained by dividing the tooth count of the front sprocket by the tooth count of the rear sprocket.

8. The bicycle motor control system according to claim 1, further comprising
a shift position detecting device that detects a current shift position of a plurality of shift positions of an internal transmission device installed on the bicycle;
the memory device is further configured to store the shift positions of the internal transmission device and a gear ratio corresponding to each of the shift positions; and
the propulsion force calculating section is configured to calculate the propulsion based on the pedaling force, the gear ratio stored in the memory device corresponding to the current shift position detected by the shift position detecting device, and the tooth count of the transmitting teeth of the drive force transmitting body stored in the memory device.

9. The bicycle motor control system according to claim 1, wherein
the memory device is further configured to store the tooth count of the drive force transmitting body that includes one of a sprocket, a toothed pulley and a bevel gear.

10. The bicycle motor control system according to claim 1, further comprising
an interface section operatively coupled to the memory device to overwrite information stored in the memory device.

11. The bicycle motor control system according to claim 10, further comprising
an input device connected to the interface section.

12. The bicycle motor control system according to claim 10, wherein
the interface section is configured to communicate using electric power line communication.

13. The bicycle motor control system according to claim 1, wherein
the plurality of transmitting teeth includes a plurality of sets of teeth, with each set of teeth having a fixed tooth count.

* * * * *